US012381979B2

(12) United States Patent
Mathur

(10) Patent No.: US 12,381,979 B2
(45) Date of Patent: Aug. 5, 2025

(54) METHOD AND APPARATUS FOR PROCESSING REQUESTS FROM VOICE BOTS

(71) Applicant: Comcast Cable Communications, LLC, Philadelphia, PA (US)

(72) Inventor: Arpit Mathur, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 126 days.

(21) Appl. No.: 18/178,348

(22) Filed: Mar. 3, 2023

(65) Prior Publication Data

US 2024/0297936 A1 Sep. 5, 2024

(51) Int. Cl.
*H04M 3/51* (2006.01)
*H04M 3/22* (2006.01)
*H04M 3/42* (2006.01)

(52) U.S. Cl.
CPC ........... *H04M 3/51* (2013.01); *H04M 3/2218* (2013.01); *H04M 3/42059* (2013.01)

(58) Field of Classification Search
CPC ... H04M 3/51; H04M 3/2218; H04M 3/42059
See application file for complete search history.

(56) References Cited

U.S. PATENT DOCUMENTS

| 5,960,073 | A | * | 9/1999 | Kikinis | ................... H04M 3/51 370/352 |
| 6,907,571 | B2 | | 6/2005 | Slotznick | |
| 8,271,600 | B2 | | 9/2012 | Herold et al. | |
| 8,611,526 | B2 | * | 12/2013 | Chen | ................... H04M 3/5166 379/266.04 |
| 8,630,961 | B2 | | 1/2014 | Beilby et al. | |
| 9,008,288 | B2 | | 4/2015 | Hollander et al. | |
| 9,064,259 | B2 | * | 6/2015 | Aleksin | ................. H04W 8/183 |
| 9,369,410 | B2 | | 6/2016 | Capper et al. | |
| 9,401,989 | B2 | | 7/2016 | Uba et al. | |
| 9,471,638 | B2 | | 10/2016 | Roytman et al. | |
| 9,559,993 | B2 | | 1/2017 | Palakovich et al. | |
| 9,578,173 | B2 | | 2/2017 | Sanghavi et al. | |
| 9,992,033 | B2 | * | 6/2018 | Eisenberg | ........... H04L 12/1836 |
| 10,134,395 | B2 | | 11/2018 | Typrin | |
| 10,417,345 | B1 | | 9/2019 | Carlson et al. | |

(Continued)

FOREIGN PATENT DOCUMENTS

WO 2014/124332 A2 8/2014
WO 2017/192684 11/2017

*Primary Examiner* — Akelaw Teshale
(74) *Attorney, Agent, or Firm* — BakerHostetler

(57) ABSTRACT

Methods and systems are described for handling calls involving digital agents. Digital agents or assistants (e.g., bots) may initiate service calls on behalf of their user or handle full conversations with a service agent on behalf of their user. As described herein, if the system determines that the call is being handled by a digital agent, the call may transition to a non-voice service that can communicate with the digital agent. Communicating via a data channel such as a web service may save bandwidth and other resources. If the reason for the call cannot be resolved based on digital agent communication, the call may transition back to a voice call with human participants. Information collected from the digital agent may be provided to a human service representative if and when the session transitions back to a voice channel.

20 Claims, 8 Drawing Sheets

(56) References Cited

U.S. PATENT DOCUMENTS

| | | | |
|---|---|---|---|
| 10,733,982 B2* | 8/2020 | Grupen | G06F 40/30 |
| 10,764,428 B2* | 9/2020 | Nitidharmatut | G06Q 20/12 |
| 11,032,423 B2* | 6/2021 | Nitidharmatut | G06Q 30/0269 |
| 11,553,082 B2* | 1/2023 | Nitidharmatut | H04M 3/42102 |
| 11,843,717 B2* | 12/2023 | Chavez | H04M 3/5166 |
| 12,200,166 B2* | 1/2025 | Nitidharmatut | H04M 15/06 |
| 12,236,431 B1* | 2/2025 | Jayapalan | G06Q 20/4016 |
| 2003/0099343 A1* | 5/2003 | Dezonno | H04M 3/5191 379/265.11 |
| 2009/0245500 A1 | 10/2009 | Wampler | |
| 2011/0286586 A1* | 11/2011 | Saylor | H04M 1/72436 379/88.13 |
| 2012/0016678 A1 | 1/2012 | Gruber et al. | |
| 2012/0222069 A1* | 8/2012 | Chavez | H04N 7/147 725/106 |
| 2012/0265800 A1* | 10/2012 | Tuchman | G06Q 10/06 709/203 |
| 2014/0047001 A1 | 2/2014 | Phillips et al. | |
| 2015/0186156 A1 | 7/2015 | Brown et al. | |
| 2016/0044380 A1 | 2/2016 | Barrett | |
| 2016/0094711 A1* | 3/2016 | Xu | H04M 3/5191 379/207.05 |
| 2016/0335532 A1 | 11/2016 | Sanghavi et al. | |
| 2017/0180284 A1* | 6/2017 | Smullen | H04L 69/14 |
| 2017/0279963 A1* | 9/2017 | Mittal | H04M 11/08 |
| 2019/0058792 A1* | 2/2019 | Wolf | G06F 16/3329 |
| 2020/0344187 A1* | 10/2020 | D'Agostino | H04L 51/02 |
| 2021/0136208 A1* | 5/2021 | Adibi | G06N 5/022 |
| 2021/0409542 A1* | 12/2021 | Chavez | H04L 51/02 |
| 2022/0103684 A1* | 3/2022 | Chavez | H04M 3/5166 |
| 2022/0353304 A1* | 11/2022 | White | H04L 12/1822 |
| 2025/0097349 A1* | 3/2025 | Nitidharmatut | G06N 5/04 |

\* cited by examiner

METHOD AND APPARATUS FOR PROCESSING REQUESTS FROM VOICE BOTS

BACKGROUND

Service providers are increasingly using digital agents or assistants (e.g., bots) to answer service inquiries. Digital agents or assistants (e.g., bots) are being provided more frequently by various service providers (e.g., internet service providers, mobile service providers, mobile device manufacturers, and the like) that can initiate service calls on behalf of their users. For example, some services may provide a bot that can start a call to a 1-800 number and then stay on hold until a human agent is available. These bots may also be able to handle full conversations with a service agent on behalf of their user.

One issue presented by bot initiated calls, is that waiting times on call queues may be excessive due to the potential increase in voice calls. Accordingly, there is a need for improved techniques for handling bot calls handled on behalf of a human user.

SUMMARY

This Summary is provided to introduce concepts that are further described herein. This Summary is not intended to be used to limit the scope of the claimed subject matter. Methods and systems are described for handling calls involving digital agents. Digital agents or assistants (e.g., bots) may initiate service calls on behalf of their user or handle full conversations with a service agent on behalf of their user. As described herein, if the system determines that the call is being handled by a digital agent, the call may transition to a non-voice service that can communicate with the digital agent. Communicating via a data channel such as a web service may save bandwidth and other resources. If the reason for the call cannot be resolved based on digital agent communication, the call may transition back to a voice call with human participants. Information collected from the digital agent may be provided to a human service representative if and when the session transitions back to a voice channel.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Methods and systems are described for handling calls involving digital agents or assistants (e.g., bots). Digital agents or assistants (e.g., bots) may initiate service calls on behalf of their user or handle full conversations with a service agent on behalf of their user. Since the device associated with the digital agent may have access to information associated with the reason for the call (e.g., the user's problem or complaint), in accordance with the techniques described herein, the call may transition to a non-voice service that can communicate with the digital agent. For example, the service provider may communicate with the digital agent via a data channel (e.g., a web service) to collect information from the digital agent, provide troubleshooting solutions, and transition the digital agent back to the voice channel if indeed a human user is detected.

For example, when a voice call is initiated, the call may transition to a bot-to-bot communication session. During the bot-to-bot communication session, the bots may exchange information in a structured back and forth. The bot-to-bot communication session may be transferred from a voice channel to a data channel thereby saving bandwidth and resources. If and when the bot-to-bot communication ends and human communication is needed, the communication is transferred back to the voice channel. For example, during the voice call, the bot-to-bot communication is detected and the call is transferred to a Hypertext Transfer Protocol (HTTP) session, and then rejoined to the voice session once a human interaction is sensed.

Figure 1:
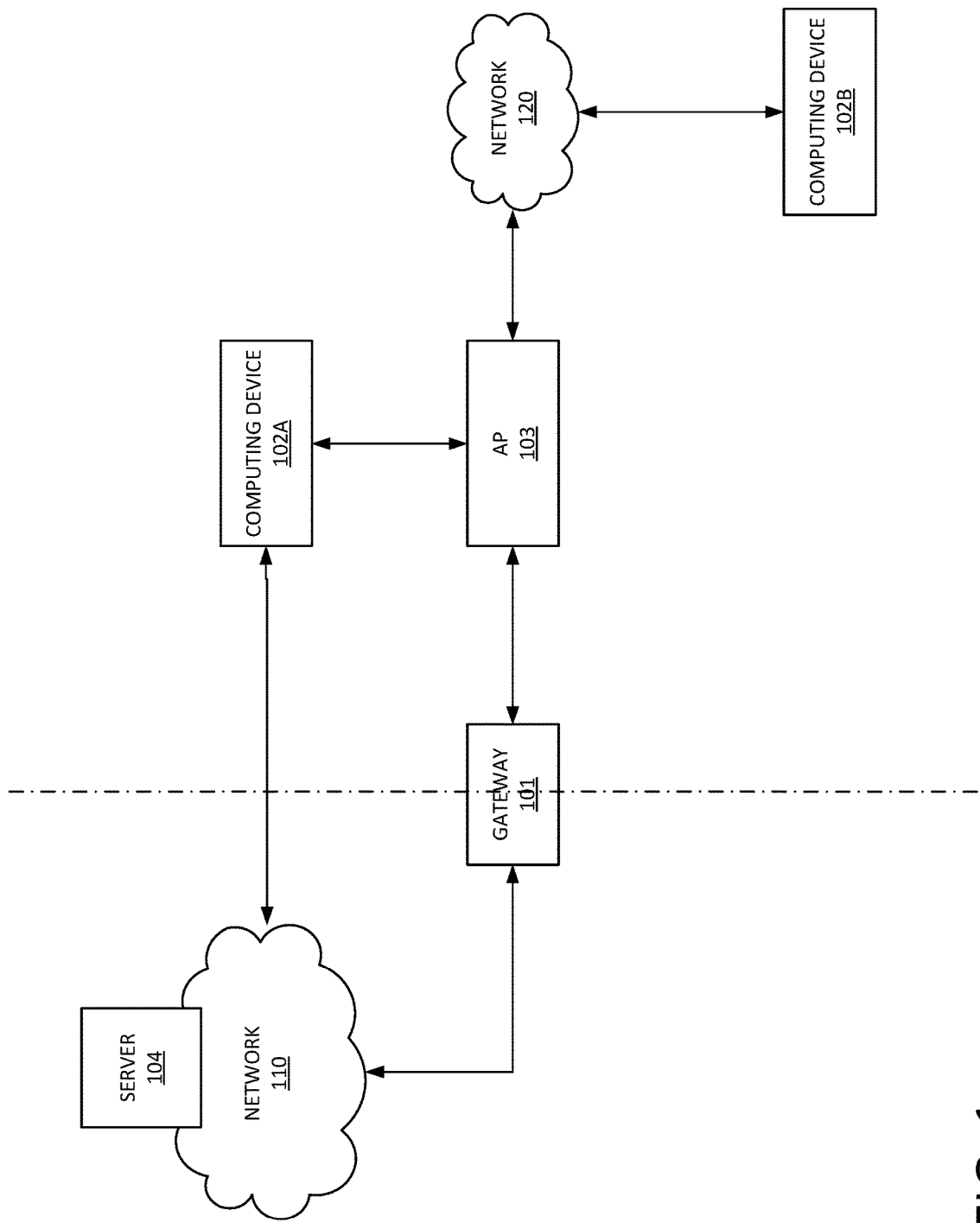
FIG. 1 shows an example system.

FIG. 1 shows an example system 100. A computing device 102*a* may comprise a smartphone, a tablet, a wearable computing device, a mobile computing device, a telephone, a Voice Over Internet Protocol (VoIP) telephone, a television, a monitor, a laptop, a desktop computer, a set-top box, or any computing device configured to initiate or receive a call and/or render content, the like, and/or any combination of the foregoing. A computing device 102*b* may comprise a smartphone, a tablet, a wearable computing device, a mobile computing device, a telephone, a Voice Over Internet Protocol (VoIP) telephone, a television, a monitor, a laptop, a desktop computer, a set-top box, or any computing device configured to initiate or receive a call and/or render content, the like, and/or any combination of the foregoing. The computing devices 102*a* and 102*b* may comprise transmitters, receivers, and/or transceivers for communicating via a network 120 and/or a network 110. The server 104 may be associated with a service. The service may be associated with, for example, a corporation, a product, a content provider the like, and/or any combination of the foregoing.

The system 100 may comprise a gateway 101. The gateway 101 may send signals via the network 110. The network 110 may comprise a network such as the Internet or any other network described herein. The gateway 101 may operate as a wireless local area network (WLAN) router and cable modem. An access point (AP) 103 may send signals, to the computing devices 102*a* and 102*b*, via the network 120. The AP 103 may receive signals, from the computing devices 102*a* and 102*b*, via the network 120. The AP 103 may communicate with the gateway 101 to provide Wi-Fi communications via network 120. The gateway 101 and AP 103 may be part of the same device and are depicted separately in FIG. 1 as an example. The AP 103 may comprise one or more radios each comprising transmitters, receivers, and/or transceivers for communicating via the network 120. The network 120 may comprise a Wi-Fi network. The network 120 may communicate using technologies such as WLAN technology based on the Institute of Electrical and Electronics Engineers (IEEE) 802.11 standards or any other appropriate technologies. A user initiating a call to the server may initiate the call via the computing device 102a or the computing device 102b. The call may be a customer call to the server 104.

Figure 2:
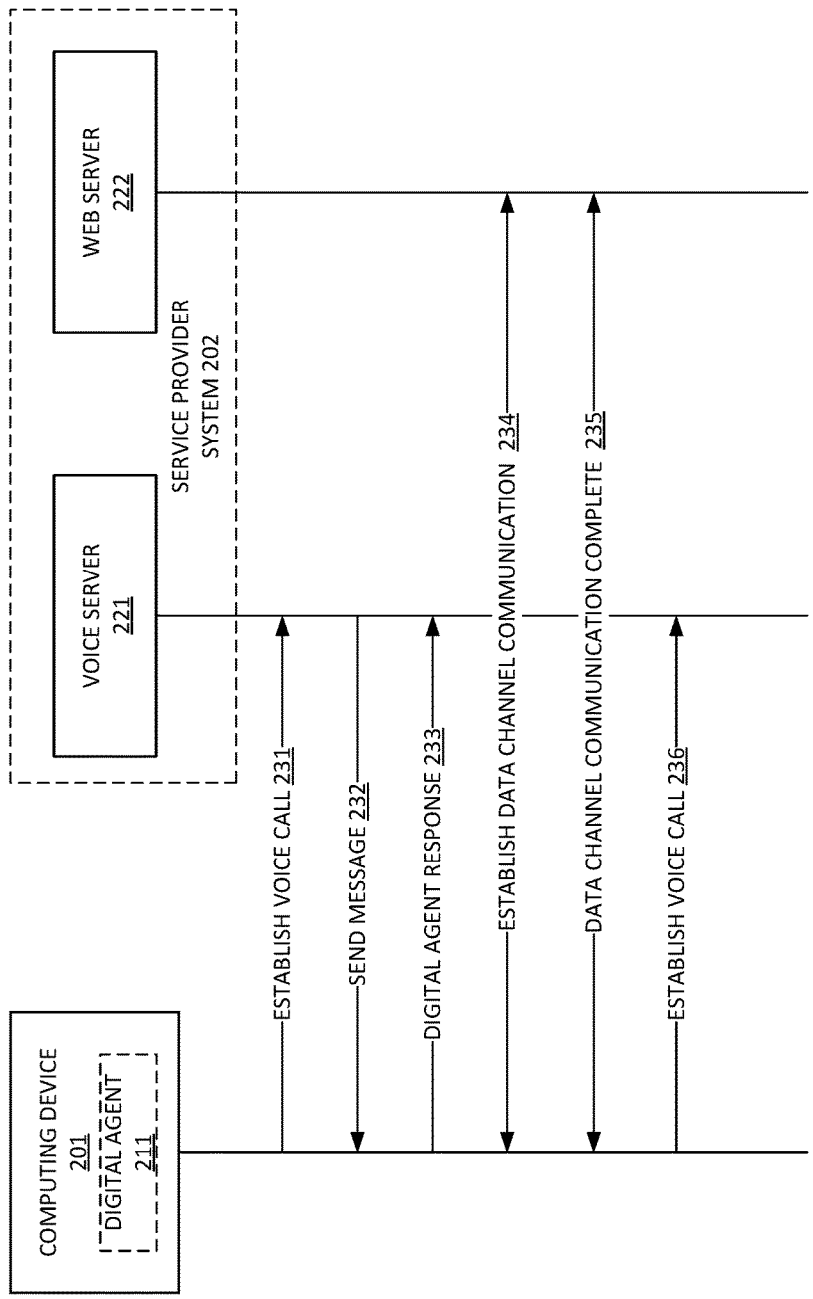
FIG. 2 shows an example method.

FIG. 2 is an example method 200. At step 231, a computing device 201 may send, to a voice server 221, a message comprising a request to establish a voice call. The call may be a request for some type of service such as a request to troubleshoot a product or service. The voice server 221 may be associated with a service provider system 202 that can handle the request. The service provider system 202 may be associated with, for example, a corporation, a product, a content provider the like, and/or any combination of the foregoing. At step 232, the voice server 221 may send a message to the computing device 201. The message may comprise an automated response. The automated response may comprise, for example, an inaudible tone. The message may enable the voice server 221 to determine whether the incoming call is from a human user or a digital agent 211 associated with the computing device 201. For example, the second message may comprise an inaudible tone configured to be processed (e.g., understandable) by the digital agent 211. For example, the inaudible tone may be sent with an audible welcome message. At step 233, the digital agent 211, may respond. For example, the digital agent 211 may provide information in the response indicating that the digital agent 211 is authorized to act on behalf of the user of the computing device 201. For example, the digital agent 211 may provide an access token in the response indicating that the digital agent 211 is authorized to act on behalf of the user of the computing device 201. For example, the digital agent 211 may provide an acknowledgement of the tone with a similar tone or other message such as an audio message. For example, in the case where the digital agent 211 is not handling the call, the human user of the computing device 201, after not hearing the tone, may continue to hold.

At step 234, data channel communication between the digital agent 211 and a web server 222 may be established for the call. The web server 222 may be associated with the service provider system 202. For example, once the system knows it is interacting with the digital agent 211, the server 222 may send data to the digital agent 211 to handle the call on a different channel such as the data channel. For example, the data channel may comprise a HTTP web service rather than a voice channel. The web server 222 may send information to the computing device 201 indicating the channel to which to switch the call. For example, the web server 222 can use the data channel to send an HTTP request to the data channel and post the data associated with the user such as account number, name, etc. and information regarding the reason for the call. The web server 222 may respond with possible causes, known issues (outages, etc.) or any other relevant data that the digital can either act on or communicate to the user.

At step 235, the web server 222 may indicate that the data channel communication is complete. For example, if the digital agent and web server 222 cannot resolve the issue that is the reason for the call, the web server 222 may end the data channel communication. For example, the web server 222 may provide a capability or option allowing the user to rejoin the call. At step 236, the computing device 201 may reconnect to the voice channel. For example, the user may be placed back in the voice call queue. The user may be given priority over other users in the voice call queue. When the service agent does pick up the voice call, the service agent may already have all the data needed to potentially resolve the problem based on the steps described above.

Figure 3:
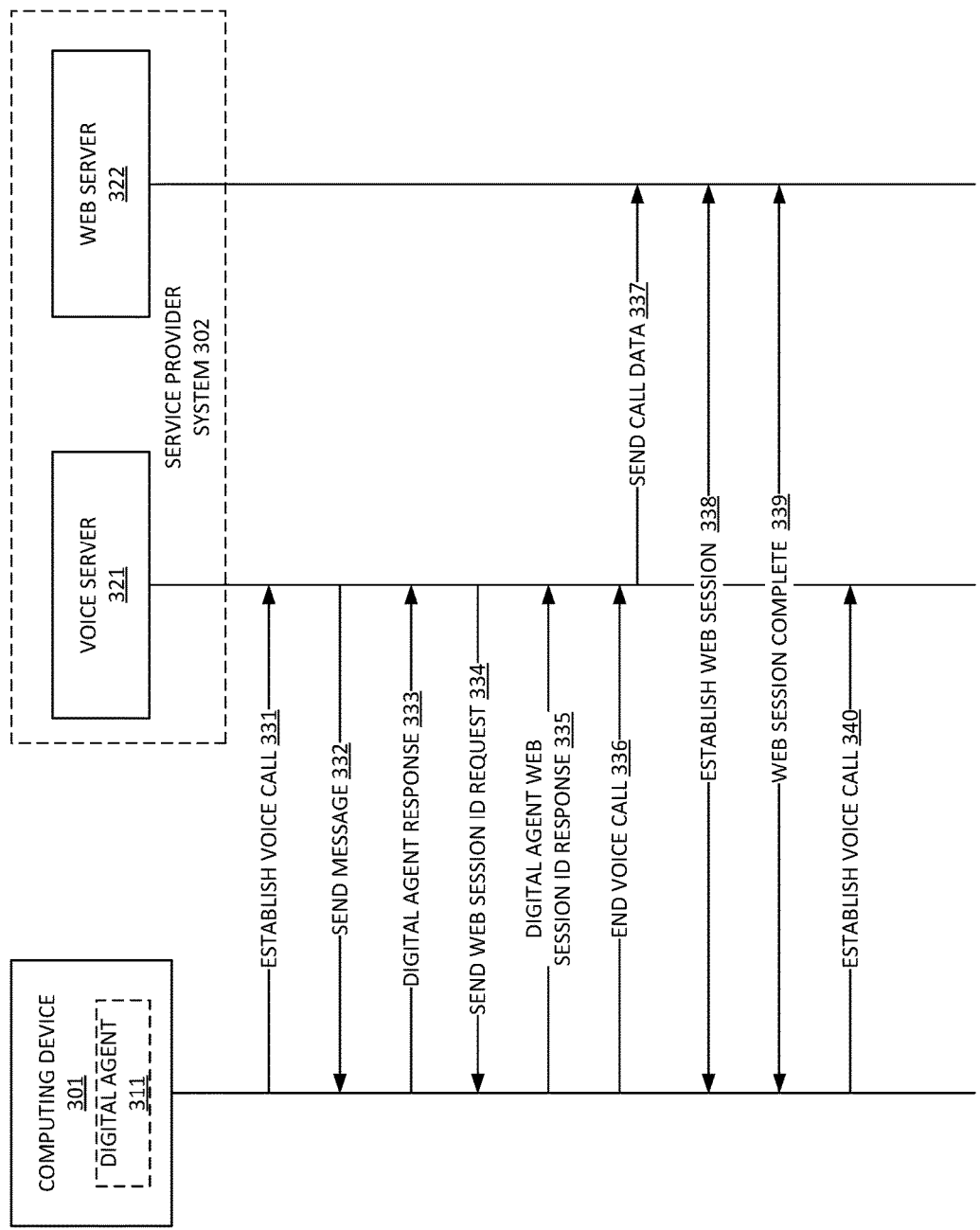
FIG. 3 shows an example method.

FIG. 3 is an example method 300. At step 331, a computing device 301 may send, to a voice server 321, a message comprising a request to establish a voice call. The call may be a request for some type of service such as a request to troubleshoot a product or service. The voice server 321 may be associated with a service provider system 302 that can handle the request. The service provider system 302 may be associated with, for example, a corporation, a product, a content provider the like, and/or any combination of the foregoing. At step 332, the voice server 321 may send a message to the computing device 301. The message may comprise an automated response. The automated response may comprise, for example, an inaudible tone. The message may enable the voice server 321 to determine whether the incoming call is from a human user or a digital agent 311 associated with the computing device 301. For example, the second message may comprise an inaudible tone configured to be processed (e.g., understandable) by the digital agent 311. For example, the inaudible tone may be sent with an audible welcome message. At step 333, the digital agent 311, may respond. For example, the digital agent 311 may provide information in the response indicating that the digital agent 311 is authorized to act on behalf of the user of the computing device 301. For example, the digital agent 311 may provide an access token in the response indicating that the digital agent 311 is authorized to act on behalf of the user of the computing device 301. For example, the digital agent 311 may provide an acknowledgement of the tone with a similar tone or other message such as an audio message. For example, in the case where the digital agent 311 is not handling the call, the human user of the computing device 301, after not hearing the tone, may continue to hold.

At step 334, the voice server 321 may send a web session identifier request to the digital agent 311. The web session identifier request may comprise information associating the voice call with a web session. For example, the information associating the voice call with a web session may comprise service ticket information. At step 335, the digital agent 311 may respond to the web session identifier request with an indication that transferring the voice call to a web session is permitted. For example, the digital agent 311 may respond with an indication that using the same service ticket information from the voice call for the web session is permitted. At step 336, the digital agent may end the voice call.

At step 337, the voice server 321 may send information associated with the voice call to a web server 322 so that the web server can continue the call. The web server 322 may be associated with the service provider system 302. At step 338, a web session between the digital agent 311 and the web server 322 may be established for the call. At step 339, the web server 322 may indicate that the web session is complete. For example, if the digital agent and web server 322 cannot resolve the issue that is the reason for the call, the web server 322 may end the web session. For example, the web server 322 may provide a capability or option allowing the user to rejoin the call. At step 340, the computing device 301 may reconnect to the voice channel. For example, the user may be placed back in the voice call queue. When the service agent does pick up the voice call, the service agent may already have all the data needed to potentially resolve the problem based on the steps described above.

Figure 4:
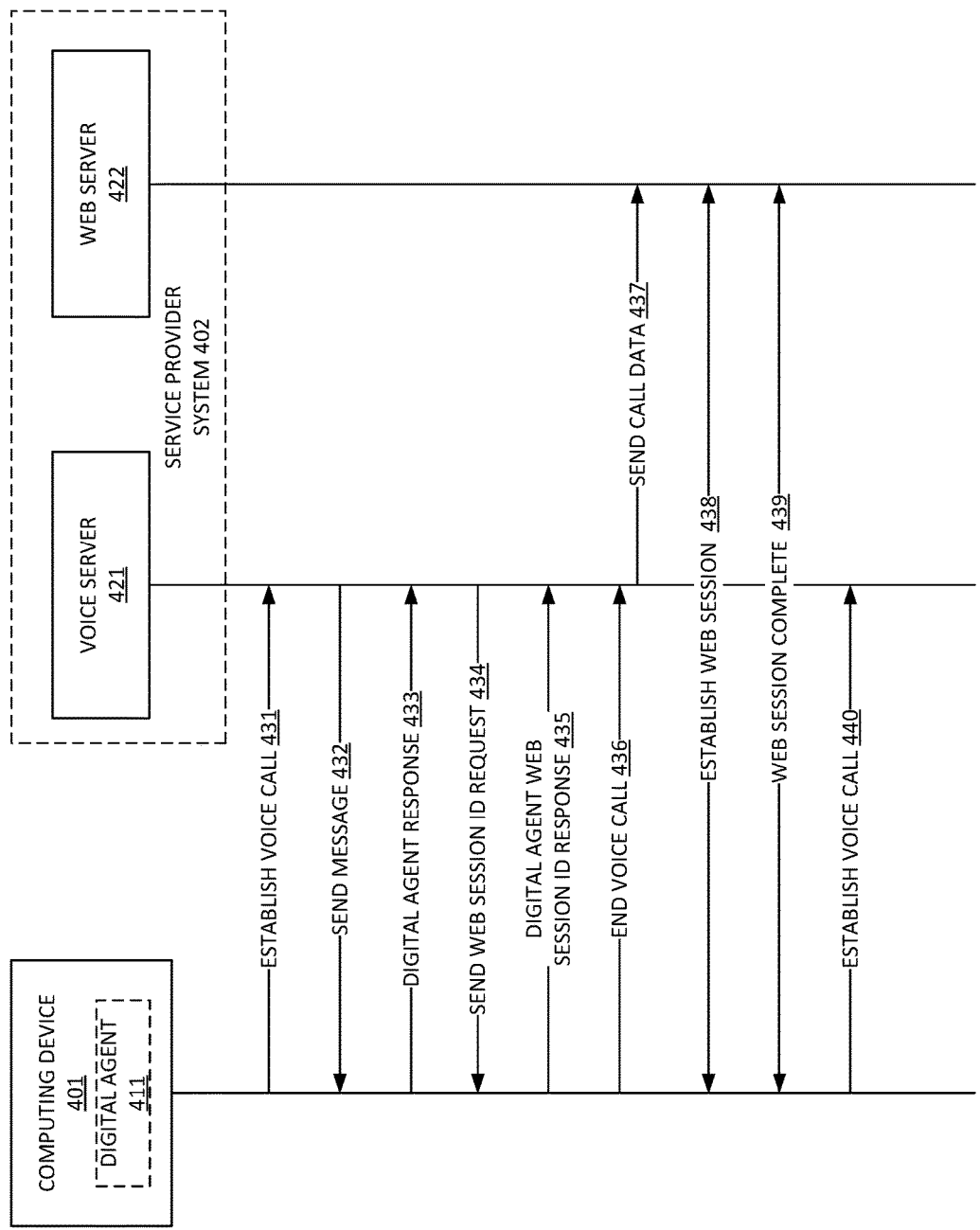
FIG. 4 shows an example method.

FIG. 4 is an example method 400. At step 431, a computing device 401 may send, to a voice server 421, a message comprising a request to establish a voice call. The call may be a request for some type of service such as a request to troubleshoot a product or service. The voice server 421 may be associated with a service provider system 402 that can handle the request. The service provider system 402 may be associated with, for example, a corporation, a product, a content provider the like, and/or any combination of the foregoing. At step 432, the voice server 421 may send a message to the computing device 401. The message may comprise an automated response. The automated response may comprise, for example, an inaudible tone. The message may enable the voice server 421 to determine whether the incoming call is from a human user or a digital agent 411 associated with the computing device 401. For example, the second message may comprise an inaudible tone configured to be processed (e.g., understandable) by the digital agent 411. For example, the inaudible tone may be sent with an audible welcome message. At step 433, the digital agent 411, may respond. For example, the digital agent 411 may provide information in the response indicating that the digital agent 411 is authorized to act on behalf of the user of the computing device 401. For example, the digital agent 411 may provide an access token in the response indicating that the digital agent 411 is authorized to act on behalf of the user of the computing device 401. For example, the digital agent 411 may provide an acknowledgement of the tone with a similar tone or other message such as an audio message. For example, in the case where the digital agent 411 is not handling the call, the human user of the computing device 401, after not hearing the tone, may continue to hold.

At step 434, the voice server 421 may send a web session identifier request to the digital agent 411. The web session identifier request may comprise information associating the voice call with a web session. For example, the information associating the voice call with a web session may comprise service ticket information. At step 435, the digital agent 411 may respond to the web session identifier request with an indication that transferring the voice call to a web session is not permitted or the request is invalid. For example, the digital agent 411 may respond with an indication that the received service ticket information cannot be used. At step 436, the voice server 421 may send a request for a new web session identifier to the web server 422. The web server 422 may be associated with the service provider system 402. At step 437, the web server 422 may send a response to the new web session identifier request to the voice server 421. At step 436, the digital agent may end the voice call so that a web session may be established between the digital agent 411 and the web server 422. The web session may be established using the steps shown in FIG. 3 and described above.

Figure 5:
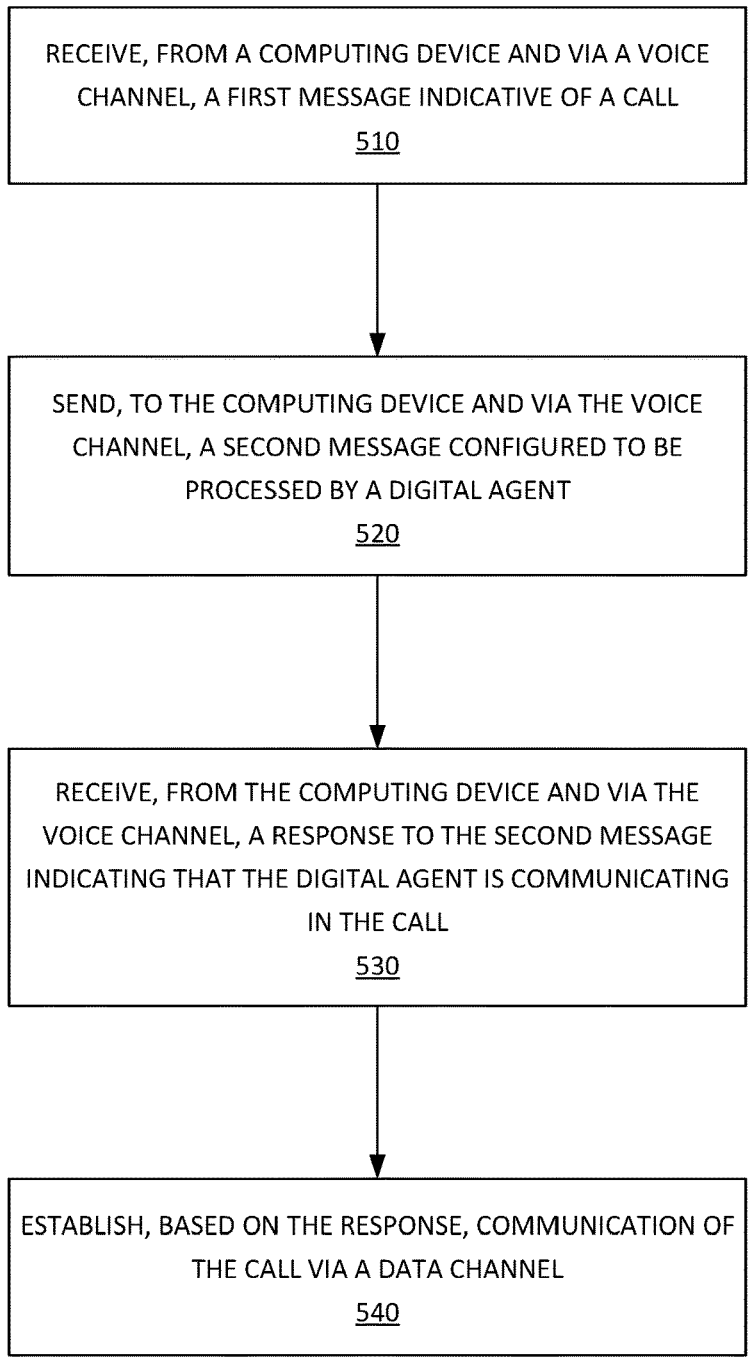
FIG. 5 shows an example method.

FIG. 5 shows an example method 500. The method 500 of FIG. 5, may be performed by any device, for example, by any of the devices depicted in FIGS. 1-4 or described herein. While each step in the method 500 of FIG. 5 is shown and described separately, multiple steps may be executed in a different order than what is shown, in parallel with each other, or concurrently with each other. At step 510, a first message indicative of a call may be received from a computing device and via a voice channel. At step 520, a second message, configured to be processed by a digital agent, may be sent to the computing device and via the voice channel. The second message may comprise an inaudible tone configured to be processed by the digital agent. The second message may comprise an automated response. The automated response may comprise, for example, the inaudible tone. For example, the second message may enable a voice server to determine whether the incoming call is from a human user or a digital agent associated with the computing device. For example, the inaudible tone may be sent with an audible welcome message.

At step 530, a response to the second message indicating that the digital agent is communicating in the call may be received from the computing device and via the voice channel. The response may comprise an acknowledgement of the inaudible tone. For example, the digital agent may provide information in the response indicating that the digital agent is authorized to act on behalf of the user of the computing device. For example, the digital agent may provide an access token in the response indicating that the digital agent is authorized to act on behalf of the user of the computing device. For example, the digital agent may provide an acknowledgement of the tone with a similar tone or other message such as an audio message. For example, in the case where the digital agent is not handling the call, the human user of the computing device, after not hearing the tone, may continue to hold.

At step 540, communication of the call via a data channel may be established based on the response. The data channel may be associated with a web session or an HTTP web service. For example, once the system knows it is interacting with the digital agent, the system may send data to the digital agent to handle the call on a different channel such as a data channel. For example, the communication of the call via the data channel may comprise communication via a first digital agent associated with the computing device and a second digital agent associated with a service provider. A third message may be received, from the computing device, indicating a user input, a voice command, or voice data. The communication of the call via the voice channel may be established based on the third message. For example, a third message requesting human interaction such as a user input, a voice command, or voice data may be sent to the computing device. The communication of the call via the voice channel may be established based on the third message.

Figure 6:
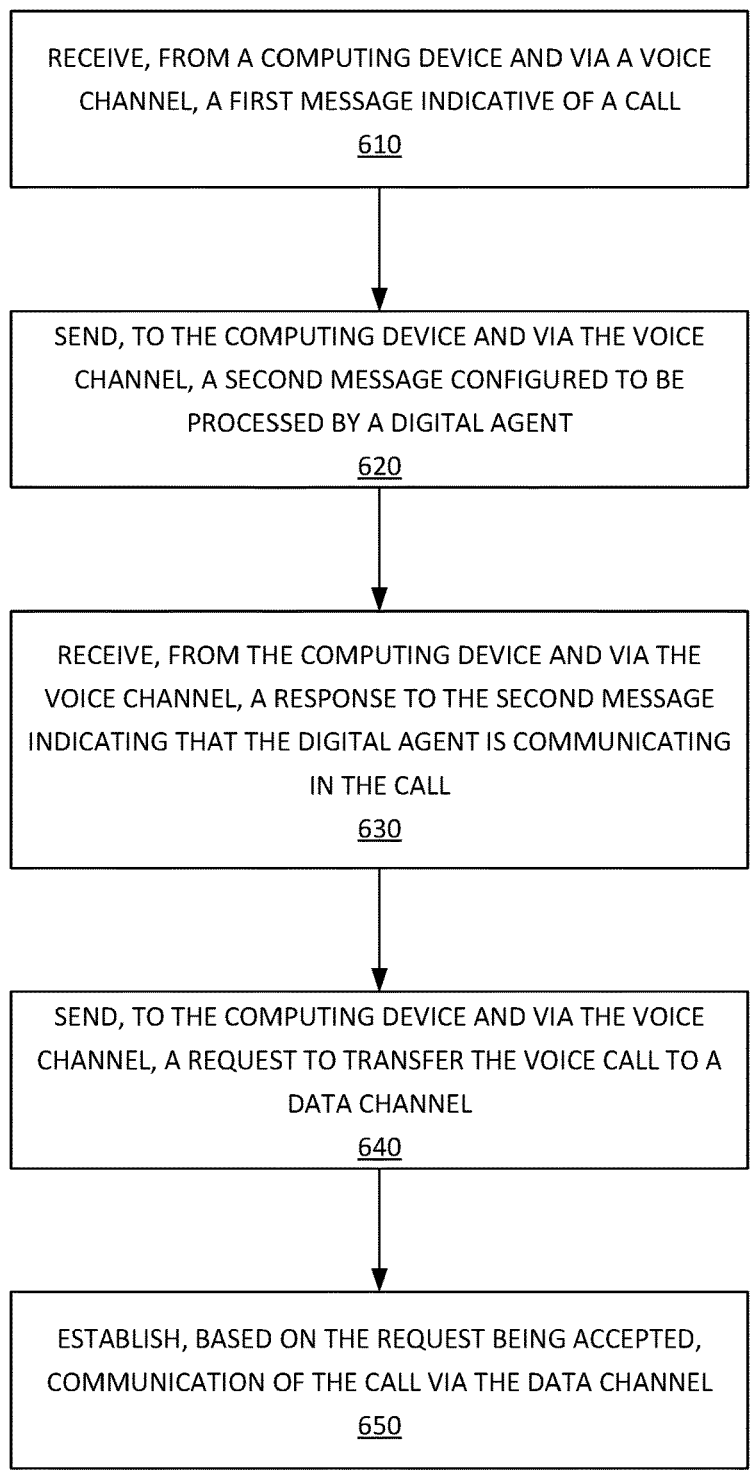
FIG. 6 shows an example method.

FIG. 6 shows an example method 600. The method 600 of FIG. 6, may be performed by any device, for example, by any of the devices depicted in FIGS. 1-4 or described herein. While each step in the method 600 of FIG. 6 is shown and described separately, multiple steps may be executed in a different order than what is shown, in parallel with each other, or concurrently with each other. At step 610, a first message indicative of a call may be received from a computing device and via a voice channel. At step 620, a second message, configured to be processed by a digital agent, may be sent to the computing device and via the voice channel. The second message may comprise an inaudible tone configured to be processed by the digital agent. The second message may comprise an automated response. The automated response may comprise, for example, the inaudible tone. For example, the second message may enable a voice server to determine whether the incoming call is from a human user or a digital agent associated with the computing device. For example, the inaudible tone may be sent with an audible welcome message.

At step 630, a response to the second message indicating that the digital agent is communicating in the call may be received from the computing device and via the voice channel. The response may comprise an acknowledgement of the inaudible tone. For example, the digital agent may provide information in the response indicating that the digital agent is authorized to act on behalf of the user of the computing device. For example, the digital agent may provide an access token in the response indicating that the digital agent is authorized to act on behalf of the user of the computing device. For example, the digital agent may provide an acknowledgement of the tone with a similar tone or other message such as an audio message. For example, in the case where the digital agent is not handling the call, the human user of the computing device, after not hearing the tone, may continue to hold.

At step 640, a request to transfer the voice call to a data channel may be sent to the computing device and via the voice channel. For example, once the system knows it is interacting with the digital agent, the system may send data to the digital agent to handle the call on a different channel such as a data channel. The data channel may be associated with a web session or an HTTP web service. For example, the communication of the call via the data channel may comprise communication via a first digital agent associated with the computing device and a second digital agent associated with a service provider. At step 650, communication of the call via the data channel may be established based on the request being accepted. A third message may be received, from the computing device, indicating a user input, a voice command, or voice data. The communication of the call via the voice channel may be established based on the third message. For example, a third message requesting human interaction such as a user input, a voice command, or voice data may be sent to the computing device. The communication of the call via the voice channel may be established based on the third message.

Figure 7:
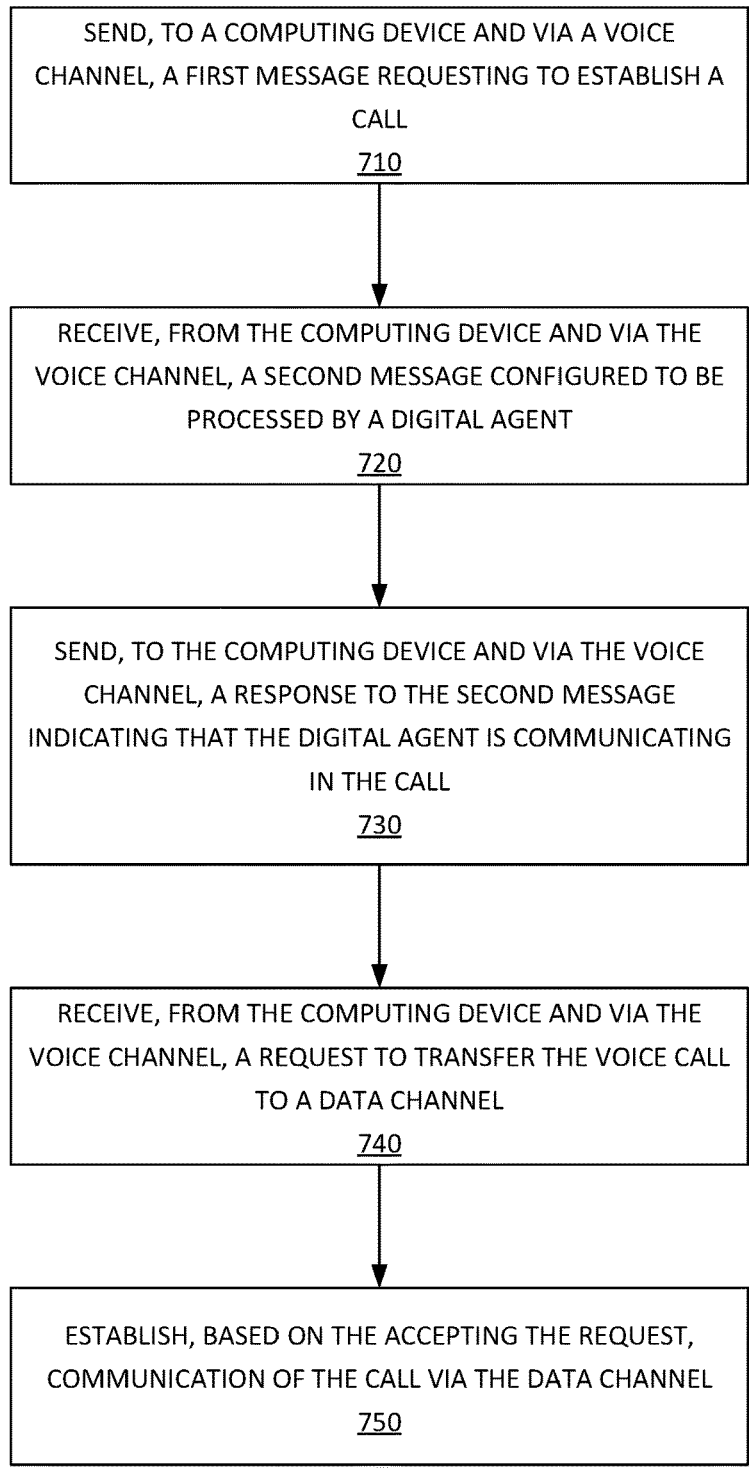
FIG. 7 shows an example method.

FIG. 7 shows an example method 700. The method 700 of FIG. 7, may be performed by any device, for example, by any of the devices depicted in FIGS. 1-4 or described herein. While each step in the method 700 of FIG. 7 is shown and described separately, multiple steps may be executed in a different order than what is shown, in parallel with each other, or concurrently with each other. At step 710, a first message requesting to establish a call may be sent to a computing device and via a voice channel. At step 720, a second message, configured to be processed by a digital agent, may be received from the computing device and via the voice channel. The second message may comprise an inaudible tone configured to be processed by a digital agent. The second message may comprise an automated response. The automated response may comprise, for example, the inaudible tone. For example, the second message may enable the computing device to determine whether the incoming call is from a human user or a digital agent. For example, the inaudible tone may be sent with an audible welcome message.

At step 730, a response to the second message indicating that the digital agent is communicating in the call may be sent to the computing device and via the voice channel. The response may comprise an acknowledgement of the inaudible tone. For example, a digital agent may provide information in the response indicating that the digital agent is authorized to act on behalf of the user of the calling computing device. For example, the digital agent may provide an access token in the response indicating that the digital agent is authorized to act on behalf of the user of the calling computing device. For example, the digital agent may provide an acknowledgement of the tone with a similar tone or other message such as an audio message. For example, in the case where the digital agent is not handling the call, the human user of the calling computing device, after not hearing the tone, may continue to hold.

At step 740, a request to transfer the voice call to a data channel may be received from the computing device and via the voice channel. For example, once the system knows it is interacting with the digital agent, the system may send data to the digital agent to handle the call on a different channel such as a data channel. The data channel may be associated with a web session or an HTTP web service. For example, the communication of the call via the data channel may comprise communication via a first digital agent associated with the computing device and a second digital agent associated with a service provider.

At step, 750, communication of the call via the data channel may be established based on accepting the request. A third message may be received, from the computing device, indicating a user input, a voice command, or voice data. The communication of the call via the voice channel may be established based on the third message. For example, a third message requesting human interaction such as a user input, a voice command, or voice data may be sent to the computing device. The communication of the call via the voice channel may be established based on the third message.

Figure 8:
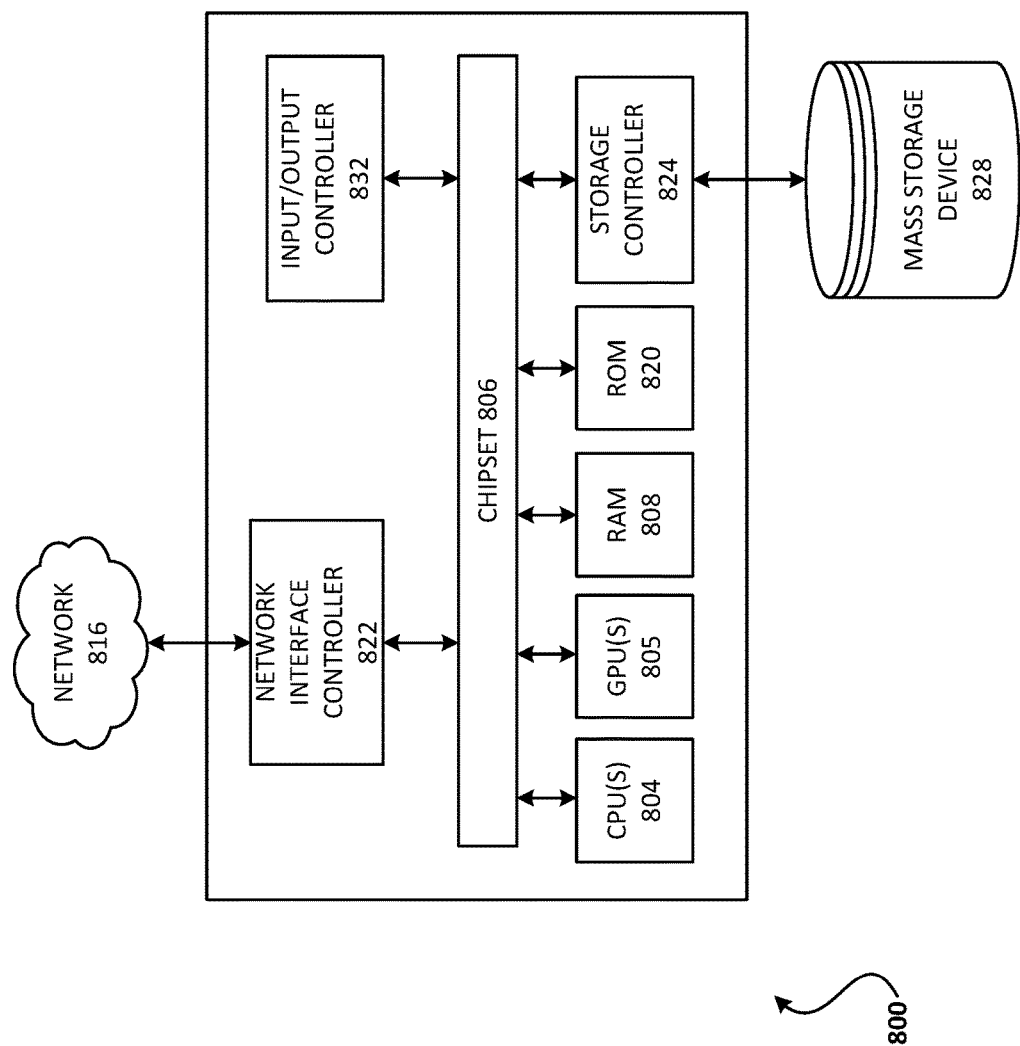
FIG. 8 shows an example computing device.

FIG. 8 depicts a computing device that may be used in various aspects, such as the servers, modules, and/or devices depicted in FIGS. 1-4. With regard to the example architecture of FIGS. 1-4, each device depicted in FIGS. 1-4 may be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-7.

The computing device 800 may comprise a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may read information from the mass storage device 828 by detecting the physical states or characteristics of one or more particular locations within the physical storage units.

In addition to the mass storage device 828 described herein, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described herein. The computing device 800 may have access to computer-readable storage media storing computer-executable instructions, which, when executed by the computing device 800, may perform the methods described in relation to FIGS. 1-7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, from a computing device and via a voice channel, a first message indicative of a call;
   sending, to the computing device and via the voice channel, a second message configured to be processed by a digital agent;
   receiving, from the computing device and via the voice channel, a response to the second message indicating that the digital agent is communicating in the call; and
   establishing, based on the response, communication of the call via a data channel.

2. The method of claim 1, wherein the second message comprises an inaudible tone configured to be processed by the digital agent.

3. The method of claim 2, wherein the response comprises an acknowledgement of the inaudible tone.

4. The method of claim 1, wherein the response comprises information indicating that the digital agent is authorized to act on behalf of a user of the computing device.

5. The method of claim 1, wherein the data channel is associated with at least one of: a web session or a Hypertext Transfer Protocol (HTTP) web service.

6. The method of claim 1, wherein the communication of the call via the data channel comprises communication via the digital agent and a second digital agent associated with a service provider.

7. The method of claim 1, further comprises:
   receiving, from the computing device, a third message indicating at least one of: a user input, a voice command, or voice data; and
   establishing, based on the third message, communication of the call via the voice channel.

8. The method of claim 1, further comprises:
   sending, to the computing device, a third message requesting at least one of: a user input, a voice command, or voice data; and
   establishing, based on the third message, communication of the call via the voice channel.

9. The method of claim 1, further comprises:
   sending, to the computing device and via the voice channel, a request to transfer the voice call to a data channel; and
   receiving, from the computing device and via the voice channel, a response indicating that the voice call data is permitted to be transferred to the data channel.

10. A method comprising:
    receiving, from a computing device and via a voice channel, a first message indicative of a call;
    sending, to the computing device and via the voice channel, a second message configured to be processed by a digital agent;
    receiving, from the computing device and via the voice channel, a response to the second message indicating that the digital agent is communicating in the call;
    sending, to the computing device and via the voice channel, a request to transfer the voice call to a data channel; and
    establishing, based on the request being accepted, communication of the call via the data channel.

11. The method of claim 10, wherein the second message comprises an inaudible tone configured to be processed by the digital agent.

12. The method of claim 11, wherein the response comprises an acknowledgement of the inaudible tone.

13. The method of claim 10, wherein the data channel is associated with at least one of: a web session or a Hypertext Transfer Protocol (HTTP) web service.

14. The method of claim 10, wherein the communication of the call via the data channel comprises communication via the digital agent and a second digital agent associated with a service provider.

15. The method of claim 10, further comprises:
    receiving, from the computing device, a third message indicating at least one of: a user input, a voice command, or voice data; and
    establishing, based on the third message, communication of the call via the voice channel.

16. The method of claim 10, further comprises:
    sending, to the computing device, a third message requesting at least one of: a user input, a voice command, or voice data; and
    establishing, based on the third message, communication of the call via the voice channel.

17. The method of claim 10, further comprises:
    receiving, from the computing device and via the voice channel, a response indicating that the voice call data is permitted to be transferred to the data channel.

18. A method comprising:
    sending, to a computing device and via a voice channel, a first message requesting to establish a call;
    receiving, from the computing device and via the voice channel, a second message configured to be processed by a digital agent;
    sending, to the computing device and via the voice channel, a response to the second message indicating that the digital agent is communicating in the call;
    receiving, from the computing device and via the voice channel, a request to transfer the voice call to a data channel; and
    establishing, based on accepting the request, communication of the call via the data channel.

19. The method of claim 18, wherein the second message comprises an inaudible tone configured to be processed by the digital agent.

20. The method of claim 18, further comprises:
    receiving, from the computing device and via the voice channel, a response indicating that the voice call data is permitted to be transferred to the data channel.

* * * * *